(12) United States Patent
Jiang et al.

(10) Patent No.: US 8,268,479 B2
(45) Date of Patent: Sep. 18, 2012

(54) BATTERY SPACER, PROTECTION ASSEMBLY FOR ELECTRIC CORE, AND POWER BATTERY

(75) Inventors: Luxia Jiang, Shenzhen (CN); Jianhua Zhu, Shenzhen (CN)

(73) Assignee: BYD Co., Ltd, Shenzhen (CN)

( * ) Notice: Subject to any disclaimer, the term of this patent is extended or adjusted under 35 U.S.C. 154(b) by 0 days.

(21) Appl. No.: 13/294,924

(22) Filed: Nov. 11, 2011

(65) Prior Publication Data

US 2012/0058391 A1    Mar. 8, 2012

Related U.S. Application Data

(63) Continuation of application No. PCT/CN2010/071762, filed on Apr. 14, 2010.

(30) Foreign Application Priority Data

May 13, 2009    (CN) .................. 2009 2 0131817 U

(51) Int. Cl.
*H01M 2/02* (2006.01)
*H01M 2/04* (2006.01)
*H01M 2/10* (2006.01)
*H01M 2/22* (2006.01)

(52) U.S. Cl. ........ 429/186; 429/159; 429/163; 429/177; 429/211

(58) Field of Classification Search .................. 429/186
See application file for complete search history.

(56) References Cited

U.S. PATENT DOCUMENTS

| | | | | |
|---|---|---|---|---|
| 8,084,155 | B2 * | 12/2011 | Jung et al. | 429/72 |
| 2007/0231686 | A1 * | 10/2007 | Kim | 429/180 |
| 2009/0159311 | A1 | 6/2009 | Zheng et al. | |

FOREIGN PATENT DOCUMENTS

| | | |
|---|---|---|
| CN | 2833901 Y | 11/2006 |
| CN | 201430167 Y | 3/2010 |
| JP | 11-25993 A | 1/1999 |
| JP | 2006-12657 A | 1/2006 |

OTHER PUBLICATIONS

International Search Report issued on Jul. 22, 2010 in International Application No. PCT/CN2010/071762.
PCT Written Opinion of the International Searching Authority mailed Jul. 22, 2010, for International Application No. PCT/CN2010/071762.

\* cited by examiner

*Primary Examiner* — Jonathan Crepeau
(74) *Attorney, Agent, or Firm* — Finnegan, Henderson, Farabow, Garrett & Dunner, LLP

(57) ABSTRACT

A battery spacer, a protection assembly for electric core, and a power battery are provided. The battery spacer comprises a spacer body. The spacer body comprises: a tab passing area located in a middle portion of the spacer body, the tab passing area being adapted to receive an end of an electric core of a battery; and receiving areas adjacent to ends of the tab passing area along the spacer body. The spacer body and the tab passing area provide an end wall, two side walls, and a top wall configured to surround each of the receiving area. At least one tab aperture is formed in the tab passing area and penetrates the spacer body.

10 Claims, 4 Drawing Sheets

BATTERY SPACER, PROTECTION ASSEMBLY FOR ELECTRIC CORE, AND POWER BATTERY

CROSS-REFERENCE TO RELATED APPLICATIONS

This application in a continuation of International Application No. PCT/CN2010/071762, filed Apr. 14, 2010, which claims priority to Chinese Patent Application No. 200920131817.7, filed May 13, 2009, the entire contents of which are incorporated herein by reference.

FIELD OF THE INVENTION

The present invention relates, in general, to the field of power battery technology and, in particular, to a battery spacer, a protection assembly for battery electric core comprising the battery spacer, and a power battery containing the protection assembly.

BACKGROUND

With non-renewable resources such as petroleum drying up and environmental pollutions becoming more and more serious, people pay more attention to new energy vehicles. Power battery is an essential part of the new energy vehicles. Since vehicles have great mobility and may often be subject to vibrations and impacts, the requirements for safety and reliability of power batteries are high.

Conventionally, a power battery generally comprises a positive electrode, a negative electrode, an electric core, electrolyte, a battery cover, and a battery shell. A spacer is disposed between the electric core and the battery cover.

The capacity and the volume of the power battery are high, and the electric core therein has a high volume. Meanwhile, since the electric core is formed by a plurality of layers of flexible members, the core is easy to be damaged during transportation. For batteries containing a plurality of electric cores, combination and positioning of the electric cores are difficult. During assembling of the battery, especially while fitting the battery shell over the electric core, the friction between the electric core and the battery shell surface may cause damages to the electric core. For example, during assembling of a conventional battery, adhesive tapes are used to pre-secure the electric cores, causing relative sliding between the electric cores or the current collectors. Meanwhile, the insulating material in the outmost layer of the electrode core may be damaged.

In addition, when utilized in a vehicle, vibrations and jolting of the vehicle may cause the electric core to move in the shell, thereby causing damages to the electric core. As a result, the current collector in the battery may be broken, the separator may shrink, material of the electrode plate may peel off, the welding point may be destroyed by the impacts, causing hidden safety hazards.

SUMMARY

The embodiments described herein solve at least one of the problems existing in conventional batteries.

According to one embodiment, there is provided a battery spacer that provides good insulation and protection for the electric core. The battery spacer comprises a spacer body defining a space therein. The space has a tab passing area located at a middle part of the spacer and is adapted to receive an end of an electric core of the battery. The receiving areas are adjacent to the ends of the tab passing area along the spacer body. Each receiving area is surrounded by the spacer body and the tab passing area, which form an end wall, two side walls, and a top wall for the receiving area. At least one tab aperture is formed in the tab passing area and penetrates the spacer body. According to another embodiment, during assembling of the battery, the receiving areas provide sufficient spaces for the rounded corners of the electric core, thereby providing protection for the ends of the electric core.

According to another embodiment, there is provided a protection assembly for an electric core having the battery spacer, which provides good protection for the electric core. The protection assembly comprises an upper battery spacer, a lower battery spacer, and two side boards. The ends of each side board are fixed to the upper and lower battery spacers, respectively.

According to still another embodiment, there is provided a power battery having the protection assembly for the electric core. The power battery comprises the protection assembly and at least one electric core disposed within the protection assembly.

The protection assembly has a frame-like structure which provides a good protection for the electrode during assembling, transportation, and use. When fitting the shell over the electric core, the frame-like structure also decreases the risk of shrinkage of the separator along the shell and relative sliding between electric cores, thus enhancing vibrating resistance and safety performance of the battery.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION OF EMBODIMENTS

These and other aspects, solutions, and advantages of the invention will become apparent and more readily appreciated from the following descriptions taken in conjunction with the drawings, and the embodiments should be considered as an explanation instead of limitation to the invention.

Figure 1:
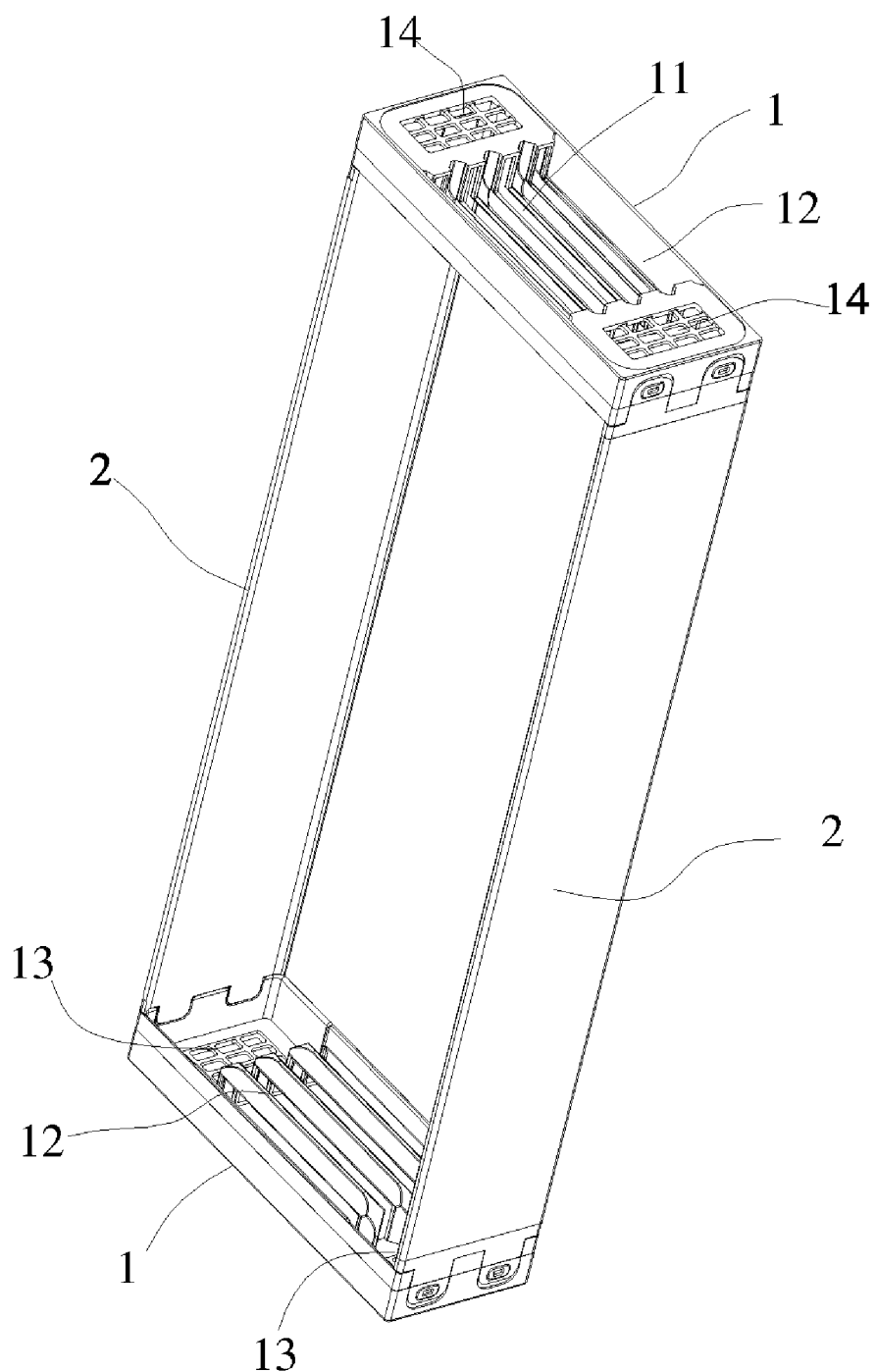
FIG. 1 depicts a perspective view of the protection assembly for electric core according to an embodiment.

FIG. 1 is a perspective view of a protection assembly for an electric core according to an embodiment. In this embodiment, the protection assembly has a frame-like structure and comprises an upper and a lower battery spacers 1. Two side boards 2 are affixed to the upper and lower battery spacers 1. The battery spacers 1 and side boards 2 may be made of an insulating material that is electrolyte-resistant and has good injection molding performance and good mechanical strength. Since the protection assembly for the electric core has a frame-like structure, it may form a framework for the electric core 3 (shown in FIG. 5 and FIG. 6). The frame-like structure may provide a good protection for the electric core 3. It decreases the risk of cockling of the separator of the battery along the shell and relative sliding between electric cores during fitting of the shell over the electric core, thus enhancing vibration resistance and safety. The above protection assembly will be described in more details below.

Figure 2:
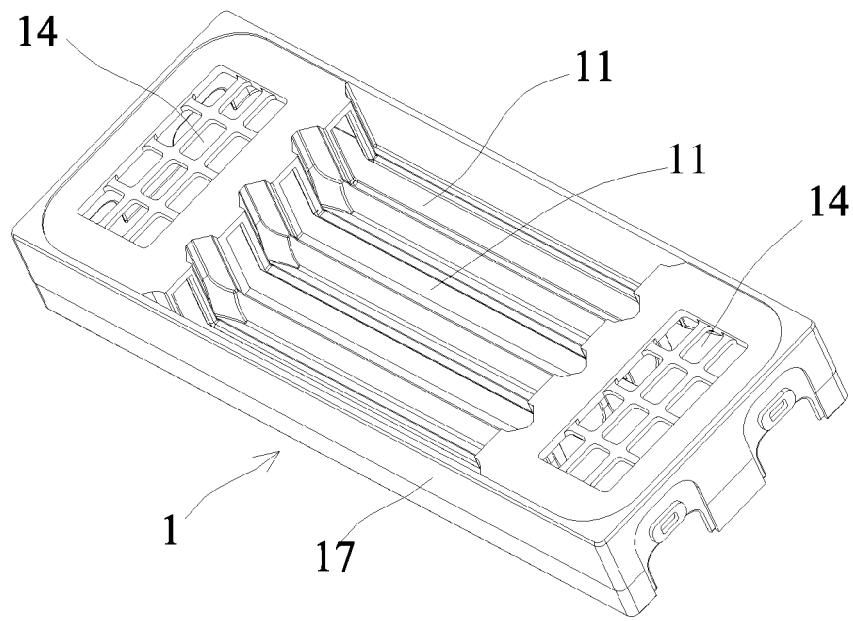
FIG. 2 depicts a perspective view of the battery spacer shown in FIG. 1, when viewed from top.
Figure 3:
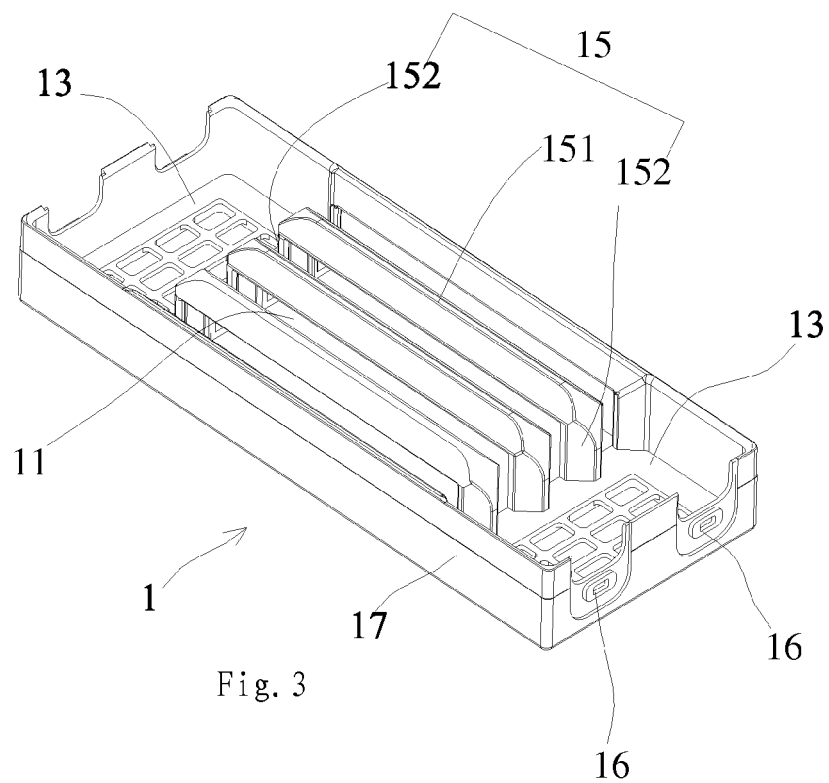
FIG. 3 depicts a perspective view of the battery spacer shown in FIG. 1, when viewed from bottom.

Referring to FIGS. 2 and 3, the battery spacer 1 comprises a spacer body 17, which has a box-like structure. The bottom (e.g. the bottom surface in FIG. 2 or the upper surface in FIG. 3) of the spacer body 17 is open. The spacer body 17 defines a space therein. This space has a tab passing area 12 located at a middle part thereof and adapted to receive the end of the electric core 3. This space further comprises two receiving areas 13 for the electric core 3, adjacent to the two ends of the tab passing area 12 along the spacer body 17. The tab passing area 12 is used for passing through a tab. The receiving area 13 is surrounded by an end wall, two side walls, and a top wall provided by the spacer body 17 and the tab passing area 12. At least one tab aperture 11 penetrating the spacer body 17 is formed in the tab passing area 12.

During assembling of the battery, the battery spacer 1 may provide a sufficient receiving space for the rounded corner part 31 of the electric core 3, and protect the end of the electric core 3. A plurality of through holes 14 are formed in the top wall of the spacer body at the receiving area 13. The through holes 14 facilitate gas discharging and electrolyte injection, and may prevent the battery cover (not shown in figures) from contacting the tabs of the electric core 3.

A plurality of tab apertures 11, each having a substantial "[" shape, are formed in the tab passing area 12. The tab apertures 11 are spaced and formed by at least one "[" shaped beam 15 disposed along the spacer body 17. The ends of each tab aperture 11 are connected with the receiving areas 13 along the spacer body 17. The beam 15 comprises a main portion 151 and connection portions 152 at two ends of the main portion 151. The connection portions 152 are extended respectively from the tab passing area 12 towards the electric core 3. Therefore, a space is formed at the outer side of the main portion 151 of the beam 15, sufficient for accommodating cover board tabs, welding tabs, etc. If there is only one tab aperture 11, the beam 15 is optional. Thus, the tab aperture 11 may be directly formed in the tab passing area 12.

Figure 5:
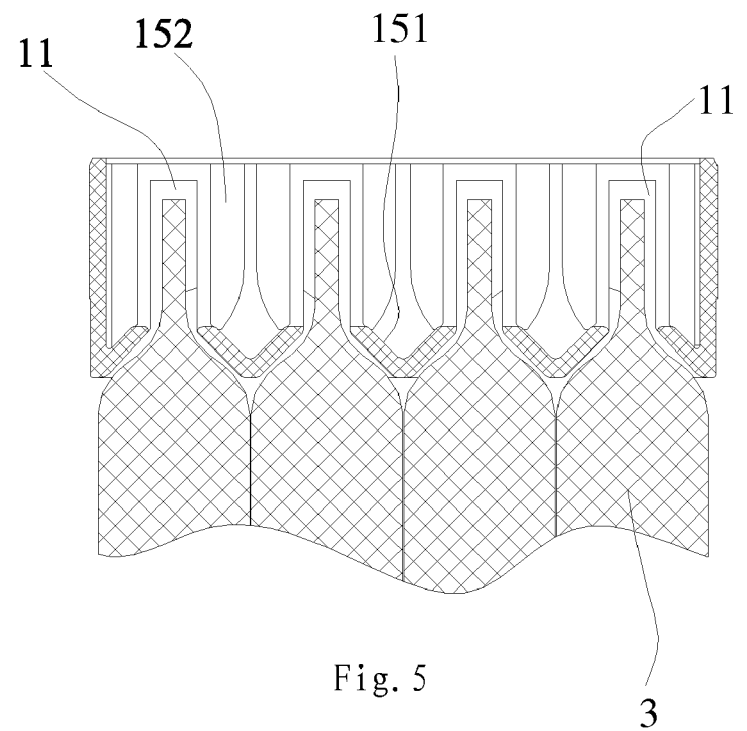
FIG. 5 depicts a partial section view of the assembled battery spacer and the electric core shown in FIG. 1.

Referring to FIG. 5, the main portion 151 of the beam 15 has a substantially V-shaped cross section. Grooves 11 are formed between adjacent main portions 151, which are adapted to receive the gradually-narrowing end portion of the electric core 3. The above mentioned structure may reduce motions of the electrode core 3 caused by motions, shaking, or vibrations of the battery pack. The main portion 151 of the beam 15 has a uniform thickness along the spacer body 17. Therefore, deformation of the battery spacer during injection molding caused by thickness variation may be reduced. In addition, the amount of raw material, the manufacturing cost, and the weight of the battery are reduced.

The battery spacer 1 has one or more snap tongues 16 at each end for connection with the side boards 2 so as to form a frame.

Figure 4:
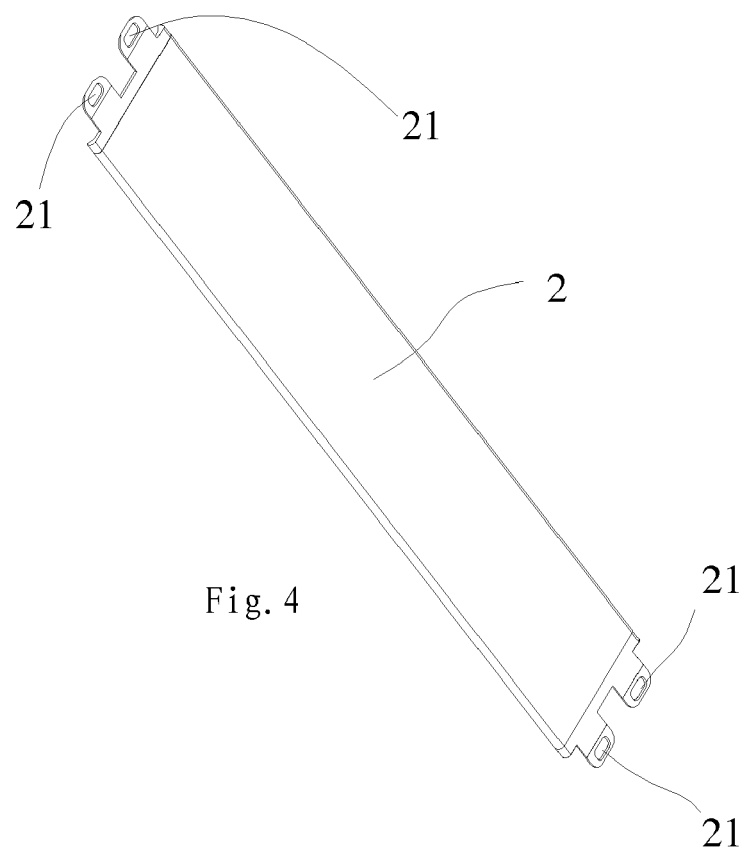
FIG. 4 depicts a perspective view of the side board shown in FIG. 1.

Referring to FIG. 4, each side board 2 has a flat plate shape. One or more snap holes 21 are formed at each end of the side board 2 for fitting with the snap tongues 16 at both ends of the battery spacer 1.

Figure 6:
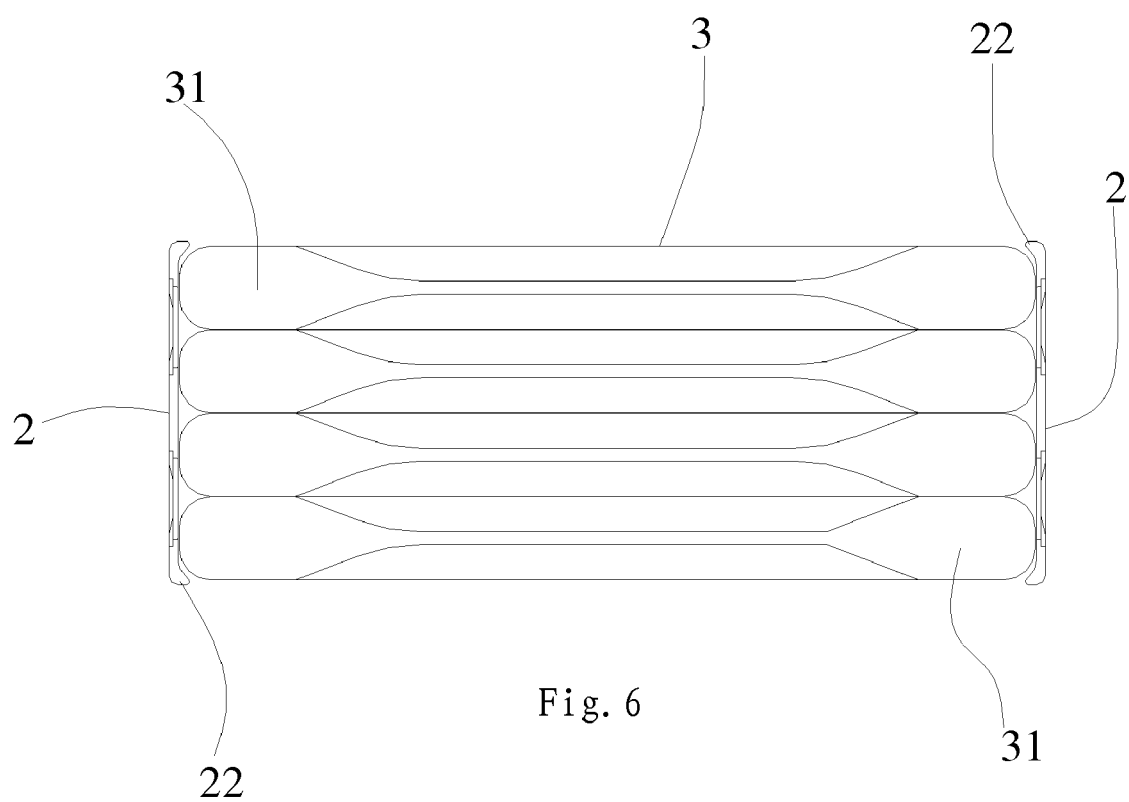
FIG. 6 depicts a top view of the assembled battery spacer and the side boards according to an embodiment.

Referring to FIG. 6, a locating cambered surface 22 extends laterally from each side the side board 2. The locating cambered surface 22 is bent towards the electric core 3. The locating cambered surface 22 enhances the strength of the side board 2 so as to enhance the supporting strength of the framework of the electric core 3. In addition, the locating cambered surface 22 may protect the side surface of the electric core 3.

The battery spacer 1 and the side boards 2 are connected via the snap tongues 16 and the snap holes 21, forming a frame as shown in FIG. 1. To further improve the strength of the frame, the snap tongues 16 and the snap holes 21 are joined by welding, such as ultrasonic welding, hot melting welding, laser welding, or other methods.

The protection assembly described herein may be applied to a single-core battery or a multiple-core battery. During assembling, the electric core 3 is disposed into the battery shell. According to the embodiments described herein, the adhesive tapes used in conventional batteries may be omitted. Thus the efficiency is increased, the relative sliding between the electric cores or current collectors is reduced, and the damages to the insulating material in the outmost layer of the electrode core is reduced.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A battery spacer, comprising:
    a spacer body comprising:
        a tab passing area located in a middle portion of the spacer body, the tab passing area being adapted to receive an end of an electric core of a battery; and
        receiving areas adjacent to ends of the tab passing area along the spacer body,
        wherein a plurality of tab apertures are formed in the tab passing area, each tab aperture has a substantial "[" shape, the tab apertures are spaced by at least one beam having a substantial "[" shape, the beam is disposed along the spacer body, and two ends of each tab aperture are connected with the receiving areas along the spacer body.

2. The battery spacer according to claim 1, wherein a plurality of through holes are formed in each receiving area and extend through a top wall of the spacer body.

3. The battery spacer according to claim 1, wherein the beam comprises a main portion and connection portions located at two ends of the main portion, the connection portions are extended, respectively, from the tab passing area towards an electric core.

4. The battery spacer according to claim 3, wherein the main portion of the beam has a substantially V-shaped cross section and a uniform thickness along the spacer body.

5. A protection assembly for electric cores of a battery, comprising:
    an upper battery spacer;
    a lower battery spacer;
    two side boards, two ends of each side board being affixed to the upper battery spacer and the lower battery spacer, respectively,
    wherein each of the upper battery spacer and the lower battery spacer comprises:
        a spacer body comprising:
            a tab passing area located in a middle portion of the spacer body, the tab passing area being adapted to receive an end of an electric core of a battery; and
            receiving areas adjacent to ends of the tab passing area along the spacer body,
            wherein at least one tab aperture is formed in the tab passing area.

6. The protection assembly according to claim 5, wherein at least one snap tongue is formed at each side of the upper battery spacer and each side of the lower battery spacer, at least one snap hole is formed at each side of each side board and adapted to snap fit with the snap tongues, and the upper battery spacer and the lower battery spacer are connected with the side boards via the snap tongues and the snap holes.

7. The protection assembly according to claim 6, wherein the joints between the snap tongues and the snap holes are welded.

8. The protection assembly according to claim 7, wherein two snap tongues and two snap holes are formed at each side of the upper battery spacer and each side of the lower battery spacer.

9. The protection assembly according to claim 5, wherein a locating cambered surface extends laterally from each side of the side board and is bent towards the electric core.

10. A power battery, comprising:
a protection assembly; and
at least one electric core disposed within the protection assembly, wherein the protection assembly comprising:
an upper battery spacer;
a lower battery spacer;
two side boards, two ends of each side board being affixed to the upper battery spacer and the lower battery spacer, respectively,
wherein each of the upper battery spacer and the lower battery spacer comprises:
a spacer body comprising:
a tab passing area located in a middle portion of the spacer body, the tab passing area being adapted to receive an end of the electric core; and
receiving areas adjacent to ends of the tab passing area along the spacer body,
wherein at least one tab aperture is formed in the tab passing area.

* * * * *